United States Patent [19]
Hikida et al.

[11] 3,871,715
[45] Mar. 18, 1975

[54] AUTOMATIC BRAKE CONTROLLING METHOD AND DEVICE

[75] Inventors: Ryotara Hikida; Yasutaka Hayashi; Hideo Arakawa, all of Nagoya, Japan

[73] Assignee: Kabushiki Kaisha Toyota Chuo Kenkyusho, Nagoya-Shi, Aichi-ken, Japan

[22] Filed: May 1, 1972

[21] Appl. No.: 249,220

[30] Foreign Application Priority Data
May 4, 1971    Japan.................................. 46-29595

[52] U.S. Cl......................... 303/21 BE, 188/181 C
[51] Int. Cl.............................................. B60t 8/08
[58] Field of Search ................ 188/181; 303/20, 21; 317/5; 324/161; 340/263

[56] References Cited
UNITED STATES PATENTS
3,598,453   8/1971   Riordan ........................ 188/181 AX
3,622,208   11/1971   Krugler, Jr...................... 303/21 BE
3,690,735   9/1972   Arai et al. ......................... 303/21 P
3,709,565   1/1973   Jonason et al................... 303/21 BE

*Primary Examiner*—Trygve M. Blix
*Assistant Examiner*—Stephen G. Kunin

[57] ABSTRACT

Automatic brake controlling method and device therefor are provided, which are characterized by detecting an acceleration (or deceleration) of a moving vehicle to compute a vehicle speed by integrating by an integrator, simultaneously when a wheel speed is detected; by feeding back the electrical signal indicating the difference between the vehicle speed and the wheel speed to the integrator and a memory circuit so as to compute the vehicle speed signal equal to the wheel speed signal, whenever a brake is not applied; by opening said feedback circuit immediately after the application of the brake, and cancelling by the memory circuit drift, noise, the effect of a gravitational acceleration when said moving vehicle is travelling on an inclined road, and the like; and by controlling the brake force so as to maintain the application of the brake at the maximum value of the coefficient of friction and the lower slip ratio.

18 Claims, 15 Drawing Figures

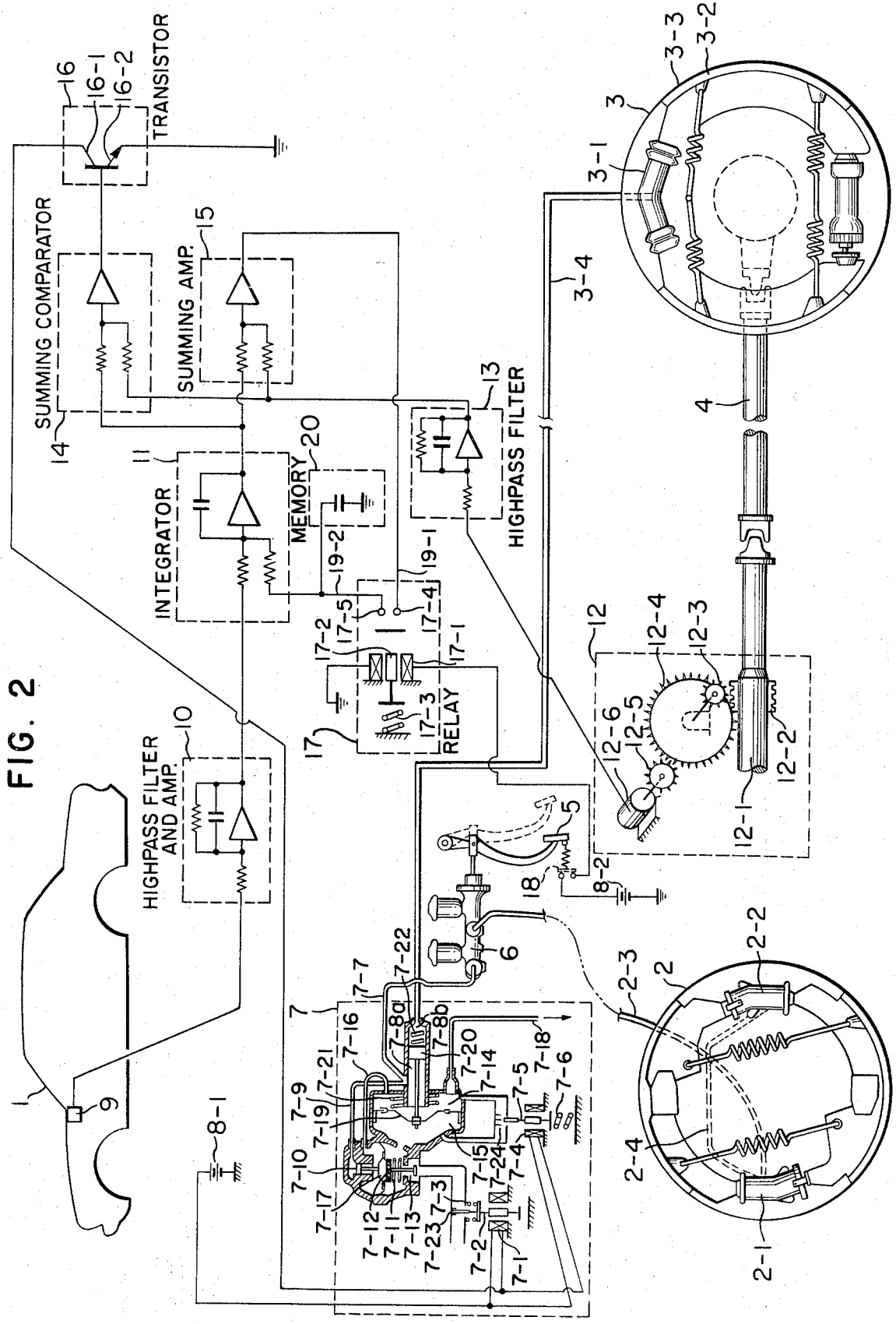

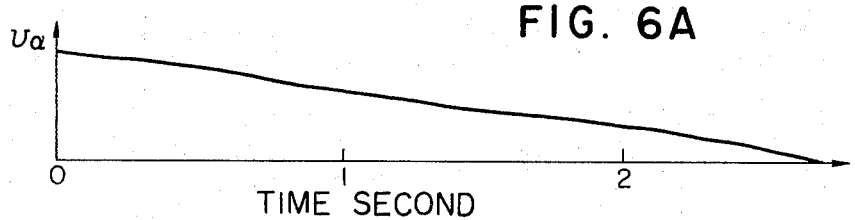
FIG. 6A
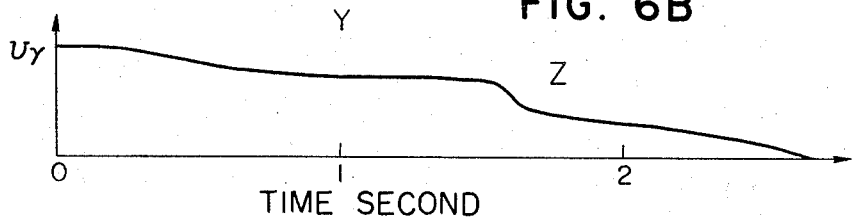
FIG. 6B
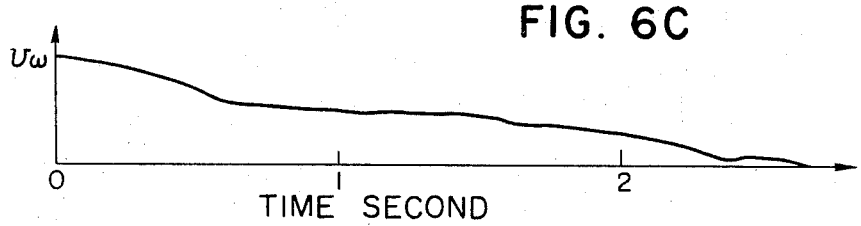
FIG. 6C
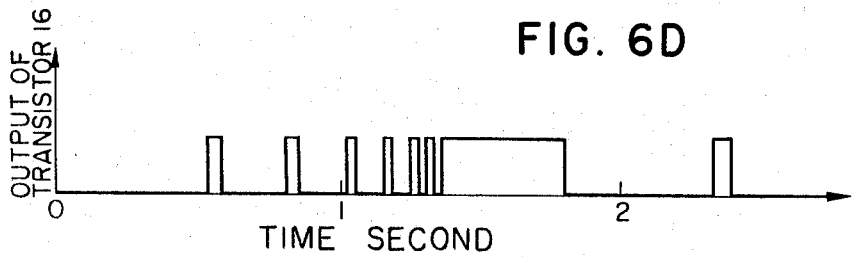
FIG. 6D
FIG. 7
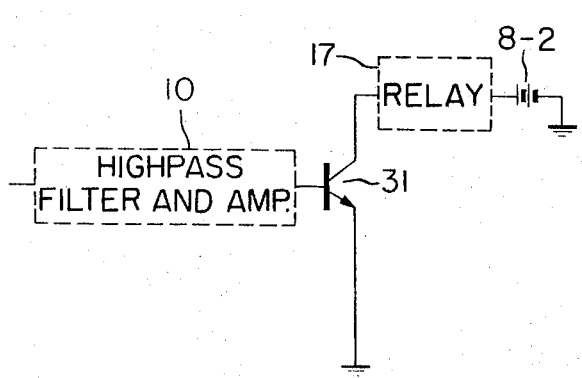
FIG. 8
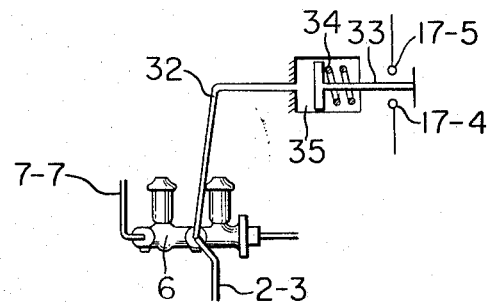

AUTOMATIC BRAKE CONTROLLING METHOD AND DEVICE

BACKGROUND OF THE INVENTION

The present invention relates to a system (method) and device for automatically controlling the hydraulic brake pressure in a brake system in response to both vehicle speed and a wheel speed so that braking may be effected while the wheel speed is maintained in the range in which the coefficient of friction between the tires and the road may become maximum.

The conventional automatic braking control systems may be generally divided into (1) a system in which the automatic braking control is effected in response to the detached acceleration of a moving vehicle, (2) a system in which the automatic braking control is effected in response to the reaction encountered by the vehicle from the road; (3) a system in which the automatic braking control is effected in response to the acceleration of the wheels; and (4) a system in which the automatic braking control is effected in response to slip ratio. In the first automatic braking control system (1), the inertia spool is displaced against the spring in response to the magnitude (absolute value) of the deceleration (which is negative when the brake is applied) so that the cross sectional area of a port in the hydraulic circuit communicating the master cylinder with the wheel cylinders may be varied. Therefore when the magnitude of acceleration (deceleration) remains large even when the brake pedal is pushed, the cross sectional area of the port remains small so that even when the hydraulic brake pressure in the master cylinder is increased only the low hydraulic brake pressure is transmitted to the wheel cylinders. Therefore the skidding of the tires may be prevented. In the second system (2), the reaction exerted to the wheels when the braking forces are applied thereto are mechanically or hydraulically detected so that the cross sectional area of the port communicating to the master cylinder may be adjusted as in the case of the first system (1) so as to prevent a decrease in the reaction thereof. The third system (3) is most widely used in practice. The rotational speed or revolution of the propeller shaft or the wheel is computed and then differentiated to obtain the acceleration of the wheel. When the acceleration is in excess of a predetermined magnitude, the hydraulic pressure in the wheel cylinders is decreased to prevent the skidding of the tires.

Prior to the description of the fourth system (4), the relation between the ratio or slip and the coefficient of friction will be explained with reference to FIG. 1 in which the slip ratio $\beta$ ((which is defined by (vehicle speed - wheel speed) / vehicle speed) is plotted along the abscissa whereas the coefficient of friction $\mu$ between the tires and the road along the ordinate. The curve A represents the relation when the road is dry whereas the curve B, when the road is icy. In case of the wetted road or gravel road, the coefficient of friction is quantitatively less than the curve A and is similar qualitatively to the curve A. From FIG. 1 it is seen that the maximum coefficient of friction can be attained when $0.1 \leq \beta \leq 0.3$. The slip ratio $\beta$ which results in the maximum value of the coefficient of friction $\mu$ is designated by $\beta_m$. It will be readily understood that when the wheel speed is so controlled that the relation $\beta = \beta_m$ may be maintained during braking the moving vehicle may be stopped at the shortest stop distance. Furthermore it should be noted that when the brake is applied as the slip ratio $\beta$ is maintained in the proximity of $\beta_m$, the steerability or maneuverability of the moving vehicle is much better than when the wheels are locked. Therefore in the fourth system (4), in addition to the measurement of the wheel speed, the acceleration of the moving vehicle is detacted and then integrated to obtain the vehicle speed, and the slip ratio $\beta$ is computed from these vehicle speed and wheel speed so that the hydraulic pressure in the wheel cylinders may be controlled to attain the desired relation of $\beta \approx \beta_m$.

In addition to the systems described above, there has been proposed a method in which the hydraulic pressure of the wheel cylinders is decreased in response to the displacement of the rear wheel suspension springs or a method in which the hydraulic pressure is applied to the rear wheel cylinders in an oscillatory manner.

However, all of the systems described above have their inherent disadvantages. In the first system (1), the acceleration is detected, but the magnitude of the slip ratio $\beta$ varies depending upon the surface condition of the road so that it is impossible to control the wheel speed in order to attain the relation of $\beta \cong \beta_m$. Furthermore, when the vehicle is travelling on an uphill or downhill road errors are introduced due to the gravitational acceleration, and the system tends to be easily damaged by vibrations. The second system (2) has the disadvantages that the system is very complex in construction and the system tends to be damaged by vibrations.

Generally the $\beta$-$\mu$ characteristic curves shown in FIG. 1 represent function of a speed of a moving vehicle in a strict sense. (Generally, $\mu$ is increased as the vehicle speed is decreased.) Therefore it does not necessarily means that $\beta$ approaches to $\beta_m$ even when the detected reaction is increased. In the system (3), the hydraulic pressures in the wheel cylinders are controlled only in the response to the rotational speed of the propeller shaft or wheel so that the function of this system is easily susceptible to disturbance under the influence of noise or the like.

The common defects in the three systems (1)-(3) arise from the fact that the braking control is effected in response to the vehicle speed or wheel speed and there is no assurance to maintain the sliding ratio in an optimum range.

The fourth system (4) is most reliable in operation and is used in airplanes. However, the conventional fourth system is objectionable in that it is very expensive as the system constitutes a sort of an electronic computer and errors are accumulated while the acceleration of the moving vehicle is integrated to compute the vehicle speed.

SUMMARY OF THE INVENTION

It is, therefore, an object of the present invention to provide a new and improved, unique and simple method and device for preventing slipping and skidding of a moving vehicle when the brake is applied.

It is another object of the present invention to provide a simple and inexpensive automatic brake controlling device having a comparator computing the slip ratio.

It is still another object of the present invention to provide a precise automatic brake controlling device having a feed back circuit to compute the vehicle speed signal equal to the wheel speed signal when the brake is not applied.

It is a further object of the present invention to provide a reliable and safe automatic brake controlling device having a memory circuit to cancel the drifts, noises, the effects of the gravitational acceleration when the moving vehicle is traveling on an inclined road, and the like in instruments adapted to obtain the vehicle speed such as accelerometer.

The automatic braking control system or method and device therefor in accordance with the present invention is based upon the principle of the fourth system (4) described above, but has the novel features hitherto unattainable by the conventional system. The first feature is that the slip ratio is computed by a comparator so that a divider used in the conventional system may be eliminated and the ON-OFF control system is employed so that the system becomes inexpensive. The second feature is that the feedback control system is employed so that when the brake is not applied, the vehicle speed signal may become equal to the wheel speed signal, whereby the errors may be prevented from accumulating. The third feature resides in the fact that a memory circuit is provided which is capable of canceling the drift, noise and the effect of the gravitational acceleration when the vehicle is travelling on an uphill or downhill road, or the like, in the accelerometer so that the errors may be prevented from accumulating and the danger that the braking force is kept reduced more than required may be prevented.

The automatic braking control system in accordance with the present invention will now be briefly described.

The signal representing the acceleration detected by means for detecting the acceleration (deceleration) of the moving vehicle is applied to an integrator in a feedback circuit and is integrated to obtain the vehicle speed signal with the sign changed. The thus obtained vehicle speed signal is then applied to a first summing amplifier in the feedback circuit and to a second summing amplifier in a switching circuit. On the other hand, the wheel speed detected by a wheel speed detecting means such as a tachometer is applied to said first and second summing amplifiers. In the first summing amplifier in the feedback circuit, the vehicle speed signal which is obtained by integrating the acceleration of the moving vehicle and changing its sign and the wheel speed signal are respectively amplified with an appropriate amplification factor and added so that the sum of the two signals may be applied to a memory circuit and to the integrator through a first switching means in the feedback circuit. When there is a difference between the absolute values of the vehicle and wheel speed signals when the vehicle is travelling upon the flat road, the signal representing this difference is applied to the input of the integrator through the feedback circuit so that the absolute value of the vehicle speed signal may be made equal to that of the wheel speed signal. When a brake pedal is pushed, means for controlling the first switching means in the feedback circuit detects the braking application to turn off said first switching means. When the first switching means is turned off, the feedback circuit is disconnected, (the feedback loop is opened), but the memory circuit stores the difference between the vehicle and wheel speed signal due to the disturbances and drifts immediately before the brake is applied, and keeps on applying this stored difference signal to the input terminal of the integrator. Thus the drifts and disturbances (noises) may be cancelled from the signals representing the acceleration of the moving vehicle. When the wheels do not slip when the brake is applied, the vehicle is decelerated while the vehicle speed signal is made equal to the wheel speed signal. In practice, however, even though the wheel speed is gradually reduced as the brake is applied, the slip occurs depending upon the conditions of the road, the weight of the moving vehicle and the inertia of the moving vehicle in response to the vehicle speed when the brake is applied and so on, so that there occurs a difference between the vehicle and wheel speed signals. Furthermore in response to the change in slip ratio, the coefficient of friction between the tires and the road changes. Therefore, when the coefficient of friction is small whereas the slip ratio is high, the braking efficiency is reduced, thus resulting in a long stop distance and poor steerability or maneuverability. Thus, safe driving is not ensured. Therefore, in order to ensure the optimum braking efficiency and safe driving, the relation between vehicle and wheel speed signals must be so adjusted that the coefficient of friction between the tires and the road may be at maximum whereas the slip ratio may be small, and when the slip ratio is in excess of a predetermined magnitude, that is when the wheel speed signal becomes less than a predetermined vehicle speed signal, the braking force must be so controlled as to be reduced.

According to the present invention, therefore, the acceleration of the moving vehicle when the brake is applied is integrated to obtain the vehicle speed signal with the sign changed. The vehicle speed signal is applied to the input of the second summing amplifier in the switching circuit together with the wheel speed signal detected in a driving system of the vehicle (i.e. transmission, propeller shaft and wheel). In the second summing amplifier, the vehicle and wheel speed signals are amplified with an appropriate amplification factor and added in order to compute the slip ratio therebetween, and then the output signal of the second summing amplifier is applied to the second switching means in the switching circuit. When the slip between the tires and road is in excess of a predetermined magnitude, that is when the wheel speed signal becomes less than a predetermined vehicle speed signal, the second switching means in the switching circuit is turned on so that the braking control means is actuated in order to attain the above described relation between the vehicle and wheel speed signals by reducing the braking force. Then the wheels are permitted to rotate freely, and the vehicle and wheel speed signals which change from time to time are applied to the second summing amplifier in the switching circuit so that when the slip ratio of the wheel speed signal to the vehicle speed signals is recovered to a predetermined value, the second switching means in the switching circuit is turned off. The braking control means which is operatively coupled to the second switch is then deactivated so that the brake may exert the braking force in response to the push applied to the brake pedal. When the wheel signal becomes less than a predetermined vehicle speed signal, the second switching means in the switching circuit is turned on again so that the braking control means is activated again to reduces the braking force. Therefore, the wheels are permitted again to rotate freely so that the desired relation between the vehicle and wheel speed signals may be attained. The above operations are cycled so that the coefficient of friction between the tires and the road may be maintained at a greater value whereas the slip ratio may be maintained at a lower ratio. Thus, the braking efficiency may be much enchanced; the stop distance of the vehicle may be reduced; and the steerability or maneuverability and hence the safety in driving may be much improved. The above features and advantages of the present invention will become more apparent from the following description of preferred embodiments thereof taken in conjunction with the accompanying drawings. In the preferred embodiments, the present invention will be described as being applied to an automotive vehicle.

BRIEF DESCRIPTION OF THE DRAWINGS

FIG. 2 is a diagrammatic view of a preferred embodiment of the present invention;

FIGS. 6A, B, C and D are graphs illustrating the experimental data obtained from the tests of the automatic brake control device shown in FIG. 2 which incorporates the device shown in FIG. 5;

FIG. 7 is a circuit diagram of a first variation of a device for turning on or off the first switching means in the automatic brake control device shown in FIG. 2;

FIG. 8 is a diagrammatic view of another variation thereof; and

Figure 1:
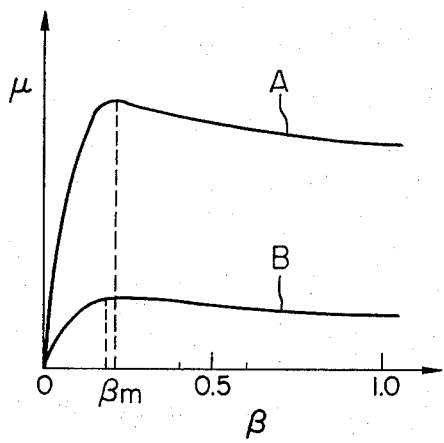
FIG. 1 is a graph illustrating the relation between the coefficient of friction and the slip ratio.

DESCRIPTION OF THE EMBODIMENTS:

Referring now to FIG. 2 illustrating one embodiment of the present invention, reference numeral 1 designates an automotive vehicle body; 2, a front wheel; 3, a rear wheel; and 4, a propeller shaft for transmission of power to the rear wheel 3. In the instant embodiment, the automatic brake control device, in accordance with the present invention, is shown as being applied only to the rear wheels 3. That is, like the conventional automatic brakes, when a brake pedal 5 is pushed, the hydraulic pressures are applied to front wheel brake cylinders 2-1 and 2-2 through brake pipes 2-3 and 2-4 from a tandem master cylinder 6. Reference numeral 7 designates a pneumatic-hydraulic control device; 8-1 and 8-2, DC power sources; 9, an accelerometer for detecting the acceleration in the moving direction of the vehicle, said accelerometer being provided in the automotive vehicle body; 10, a high pass filter and an amplifier for amplifying the signal representative of the acceleration; 11, an acceleration integrator; 12, wheel speed detector; 13, a high pass filter which is inserted to the output of the wheel speed detector 12 when required as will be described in more detail hereinafter; 14, a summing amplifier (or comparator-amplifier) which functions so that the outputs of the integrator 11 and the high pass filter 13 may be respectively amplified with an appropriate amplification factor and then may be compared with each other; 15, a summing amplifier for obtaining the difference between the outputs of the integrator 11 and the high pass filter 13; 16, a transistor which is so biased as to turn on or off in response to the output of the amplifier 14; 17, a relay for disconnecting 19-1 (input side) and 19-2 (output side) of a feedback circuit when the brake pedal 5 is pushed so that a limit switch 18 is actuated; and 20, a feedback signal memory.

Next the mode of operation will be described. When the vehicle is running without the driver applying the brake pedal 5, the limit switch 18 is not actuated so that no current flows through a coil 17-1. Therefore, a core 17-2 is pushed against contacts 17-4 and 17-5 under the force of a spring 17-3 so that 19-1 and 19-2 of the feedback circuit are connected by the switching means 17. As a result, the output signal of the summing amplifier 15 is negative-fed back to the input of the integrator 11. The input signal of the summing amplifier 15 is the sum of the output signal of the integrator representing the negative vehicle speed $-v\gamma$ and the wheel speed $v\omega$ ($v\omega = r \cdot \omega r$: radius of wheel, $\omega$: angular velocity) from the high pass filter 13 whereas the output signal is $K_1 (v\omega - v\gamma)$ where $K_1$ is of the order of $10^2$ to $10^5$. In the instant embodiment, an electric-generator tachometer is used although it does not detect the wheel speed $v\omega$ with a higher degree of accuracy. That is, the wheel speed $v\omega$ is represented by a voltage signal produced by a generator 12-6 which in turn is driven by a shaft 12-1 through a worm 12-2, a worm wheel 12-3 and reduction gears 12-4 and 12-5.

When 19-1 and 19-2 of the feedback circuit are connected $v\gamma \approx v\omega$. The reason is that if $v\gamma > v\omega$, the output signal of the summing amplifier 15 is a large signal $K_1(v\omega - v\gamma)$ with the negative sign which is applied as an input signal to the integrator 11. Therefore the output signal of the integrator 11 tends to increase since the output signal of the integrator 11 is negative so that the absolute value of the vehicle speed $v\gamma$ is decreased. As a result, the vehicle speed $v\gamma$ is so corrected as to equal approximately $v\omega$, that is $v\gamma \approx v\omega$. In a similar manner, when $v\gamma < v\omega$, $v\gamma$ becomes approximately $v\omega$, that is, $v\gamma \approx v\omega$.

The summing amplifier 14 is so designed that the amplification factor of the input signal representing the vehicle speed $-v\gamma$ is $K_2() - \beta_c)$ and the amplification factor of the input signal representing the wheel speed $v\omega$ is $K_2$. Therefore the output of the summing amplifier 14 is given by $$K_2\{(1-\beta_c)v\gamma - v_\omega\}$$

In this case, it should be noted that the magnitude of $\beta_c$ is so selected as to become slightly higher than $\beta_m$ explained hereinbefore with reference to FIG. 1. (Generally, $\beta_c \approx 0.15 \approx$ to 0.3 and sometimes higher when the esp nse of the control 7 is slow) When the brake pedal 5 is not pushed (that is, when 19-1 and 19-2 of the feedback circuit are connected) $v\gamma = v\omega$ as explained above so that the output signal $K_2\{(1 - \beta_c)v\gamma - v\omega\}$ of the second summing amplifier 14 has a negative sign. Therefore the current flowing from the collector 16-1 to the emitter 16-2 of the transistor is interrupted so that the solenoids 7-1 and 7-4 are not energized. As a result a core 7-2 is pushed down under the force of a spring 7-3 whereas a core 7-5 is pushed up under the force of a spring 7-6. Since the hydraulic pressure in the master cylinder 6 is almost zero so that the hydraulic pressure transmitted to the left chamber 7-8a of the hydraulic cylinder through the brake pipe 7-7 is also almost zero. Furthermore, the hydraulic pressure applied to a valve piston 7-10 through a pipe 7-9 is almost zero, and a piston 7-12 is lifted under the force of a spring 7-11 so that an air valve 7-13 is closed. The chambers of a booster, A 7-14 and B 7-15 are intercommunicated with each other through a pipe 7-16 and a valve 7-17. Since the chamber A 7-14 is connected to an engine intake manifold through a pipe 7-18, the both chamber A and B, 7-14 and 7-15 have the negative pressures relative to the surrounding atmosphere. A diaphragm 7-19 and a hydraulic piston 7-20 which moves in unison with the former are positioned to the left side under the forces of springs 7-21 and 7-22. Under these conditions the hydraulic pressure in the right chamber 7-8b of the hydraulic cylinder is almost zero so that no high brake pressure is supplied to a rear wheel cylinder 3-1 through a brake pipe 3-4. Therefore, brake shoes 3-2 are moved away from a brake drum 3-3. (That is, the brake is not applied.)

When the brake pedal 5 is pushed, the hydraulic pressure in the master cylinder 6 is increased and the high hydraulic pressure is tramsmitted to front wheel cylinders 2-1 and 2-2 so that the front wheel brake is actuated. In this case, simultaneously, the high hydraulic pressure is also transmitted to the left chamber 7-8a of the hydraulic cylinder through a pipe 7-7 so that the hydraulic piston 7-20 is moved to the right. As a result, the hydraulic pressure in the rear wheel cylinder 3-1 is increased so that the brake shoes 3-2 are pressed against the brake drum 3-3. The hydraulic pressure in the left chamber 7-8a of the hydraulic cylinder through the pipe 7-9 pushes downwardly the valve piston 7-10 so that a valve 7-17 is closed. As a consequence, the chamber A 7-14 is disconnected from the chamber B 7-15. As soon as the valve 7-17 is closed the air valve 7-13 is opened so that the air is introduced into the chamber B 7-15 through the air valve 7-13 because the valve 23 remains opened since the transverse 15 still remains in a cut-off state immediately after the brake pedal 5 is pushed and consequently the solenoid 7-1 remains de-energized. Therefore the pressure in the chamber B 7-15 is equal to the atmospheric pressure whereas the negative pressure is maintained in the chamber A so that the pressure difference between the chambers A and B cause the diaphragm 7-19 and the hydraulic piston 7-20 to move to the right. This promotes the movement of the hydraulic piston 7-20 to the right due to the hydraulic pressure of the hydraulic cylinder 7-8a.

The limit switch 18 is actuated when the brake pedal 5 is pushed so that the coil 17-1 is energized. As a result, the core 17-2 is pulled against the spring 17-3 so that the contacts 17-4 and 17-5 are disconnected.

Therefore, 19-1 and 19-2 of the feedback circuit are disconnected. In this case, the signal which was present immediately before 19-1 and 19-2 of the feedback circuit were disconnected is stored in the memory 20 and is applied to the input of the integrator 11 and 19-1 and 19-2 of the feedback circuit are again connected into the electronic circuit.

The signal (voltage signal) stored in the memory 20 will be briefly described hereinafter. If there is no drift in the accelerometer 9 and the amplifier 10 when the vehicle is travelling on the flat road at a constant speed, the output of the amplifier 10 must be zero. Since $v \gamma = v \omega$ c = constant), the output signal of the summing amplifier 15 is also zero. Therefore, the zero voltage signal is stored in the memory 20. However, when the vehicle is travelling on an uphill or downhill road at a constant speed, the effect of gravity in the accelerometer 9 must be taken into consideration. That is, a component of gravitational acceleration is added to the true acceleration so that even when the vehicle is travelling with a constant speed, the output of the accelerometer 9 will not become zero. Therefore the output of the amplifier 10 will not become zero so that the non-zero signal is applied from the amplifier 10 to the integrator 11. However, the output of the integrator 11 is $v \gamma = v \omega$ ( = constant) since the feedback signal from the feedback circuit 19-2 to be applied to the input of the integrator 11 cancels the drift, noise and so on of the output signal from the amplifier 10. Therefore, the signal equal to the output signal from the amplifier 10 is stored in the memory 20. In a similar manner, in order to cancel other disturbances such as drifts in the accelerometer 9 and the amplifier 10, the signal equal to the output signal of the amplifier 10 is stored in the memory 20. In summary, one of the novel features of the present invention resides in the fact that the errors in the outputs of the accelerometer 9 due to the drift, noise and the gravitational acceleration when the vehicle is travelling on the uphill or downhill road and of the amplifier 10 due to the drift, etc. may be cancelled by the provision of the memory 20 so that the vehicle speed may be computed with a greater degree of accuracy.

Next the signal to be stored in the memory 20 when the brake is applied while the vehicle is accelerated (decelerated) by engine braking and so on will be considered. When there is no influence from the gravity, drift, etc., the output signal of the amplifier 10 represents only the acceleration in the driving direction, and the change in the output signal $v \gamma$ of the integrator 11 must equal that in the wheel speed $v \omega$. Therefore, the zero signal is stored in the memory 20. When the effect of the gravity, drifts and etc. must be taken into consideration, the signals representing these effects are stored in the memory 20, as is apparent from the foregoing explanation.

Now 19-1 and 19-2 of the feedback circuit have been disconnected and the feedback signals which were present immediately before the feedback circuit was disconnected have been stored in the memory 20. Then the integration in response to the output signals from the amplifier 10 and memory 20 is carried out in the integrator 11. The output $v \gamma$ of the integrator 11 is always changing so that the absolute magnitude thereof will be different from that of the wheel speed $v \omega$. As the brake is applied, the rear wheel 3 start to slip and skid so that the slip ratio $\beta$ will gradually increase. The output signal of the summing amplifier 14 approaches from the negative value to zero and becomes zero when $\beta = \beta_c$. At this instant the transistor 16 is conducting so that the solenoids 7-1 and 7-4 are energized. Therefore, the core 7-2 is moved up to close the valve 7-23 whereas the core 7-5 is pushed down to open the valve 7-24. As a consequence, the chamber B 7-15 is out of communication with the surrounding atmosphere, and is communicated with the chamber A 7-14 through the line 7-24 so that the pressures in the chamber A and B become equal, but negative pressure relative to the atmospheric pressure. The diaphragms 7-19 and the hydraulic piston 7-20 are returned to the left positions under the forces of the springs 7-21 and 7-22 so that the hydraulic pressure in the rear wheel brake cylinders 3-1 is decreased. Therefore the brake shoes 3-2 are released accordingly from the brake drum 3-3 so that the friction therebetween is accordingly decreased. Thus, the wheel speed of the rear wheels 3 is increased as there is the friction between the rear wheels and the road. As the wheel speed $v \omega$ increased, the sign of the output signal $K_2\{(1 - \beta_c)v \gamma - v \omega \}$ of the summing amplifier 14 changes again to negative so that the transistor 16 is cut off to actuate the brake again in the manner described above. The braking force is controlled repeatedly in the manner described above until the vehicle is stopped without skidding. In summary, according to the present invention, the braking force is controlled when $\beta \geq \beta_c$, but is applied when $\beta < \beta_c$ so that $\beta$ may be always maintained in the proximity of $\beta_c$. Thus, the ideal control (for having $\beta$ equal to $\beta_c$) can be attained.

Figure 3:
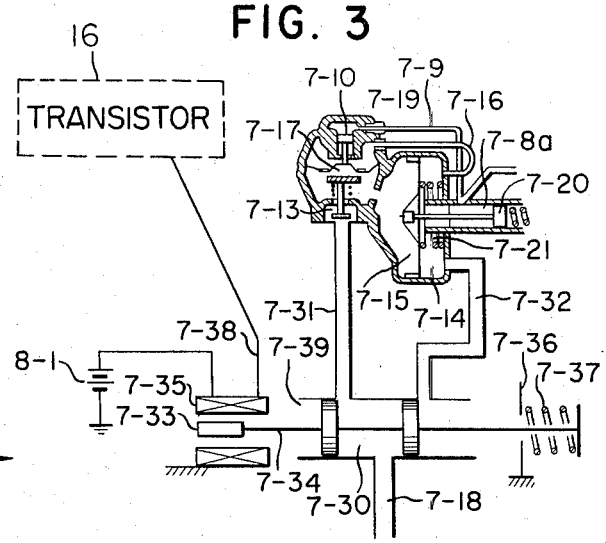
FIG. 3 is a diagrammatic view of a variation of a pneumatic-hydraulic control thereof.
Figure 4A:
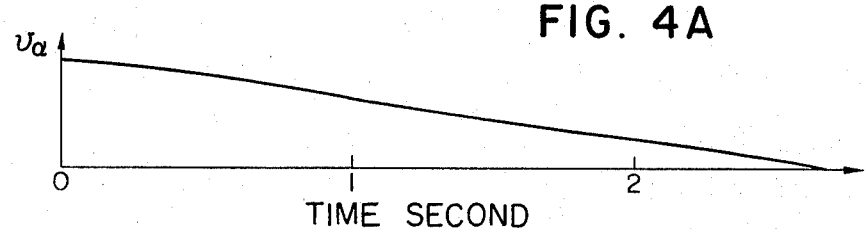
FIGS. 4A, B, C and D are graphs illustrating the experimental data obtained from the tests of the embodiment shown in FIG. 2.
Figure 4B:
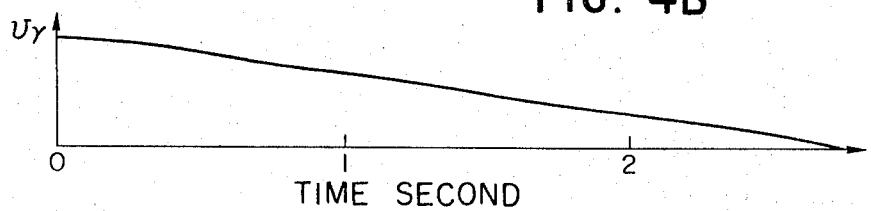
Figure 4C:
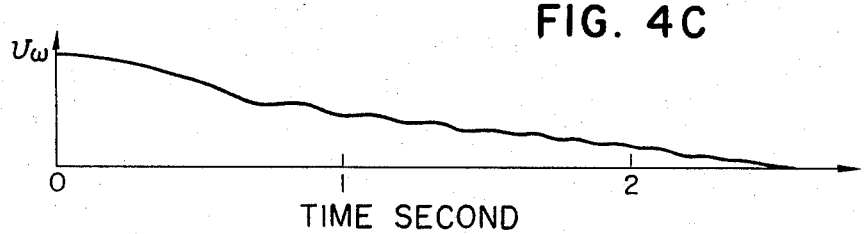
Figure 4D:
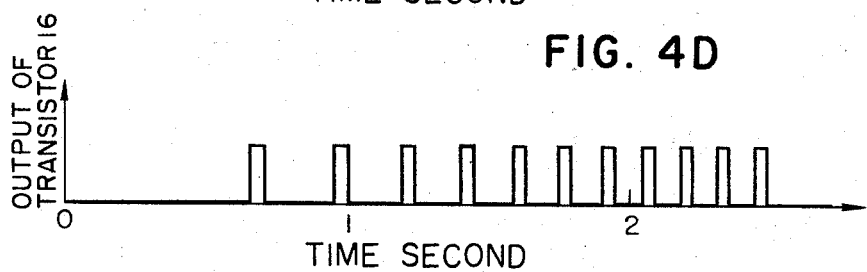

The underlying principle of the present invention has been described with reference to the embodiment shown in FIG. 2, but various modifications and variations can be effected. For example, a variation of the pneumatic-hydraulic control device 7 shown in FIG. 2 is illustrated in FIG. 3. In this variation, a four-way valve 7-30 is employed so that the atmospheric pressure and the negative pressure may be alternately supplied into the chambers A 7-14 and B 7-15. (In the embodiment shown in FIG. 2, the chamber A is not supplied with the atmospheric pressure). This variation has an advantage in that the response of the control 7 may become faster as will become apparent hereinafter. When the vehicle is travelling without pushing the brake pedal, the transistor 16 which is shown as being connected to a solenoid 7-35 through a lead 7-38 is cut off so that the solenoid 7-35 is not energized. Therefore a piston 7-34 and a core 7-33 made integral with the former are retained in the right positions (opposite to the positions shown in FIG. 3) under the force of a spring 7-37, which is limited by a stopper 7-36. Under these conditions, the chamber A 7-14 is in communication with the engine intake manifold through pipes 7-32 and 7-18 so that it has a negative pressure. The lower end of a pipe 7-31 opens to the surrounding atmosphere 7-39, but the air valve 7-13 is closed so that the chamber B 7-15 is out of communication with the surrounding atmosphere 7-39. Furthermore the valve 7-17 remains opened so that the chamber B 7-15 has a negative pressure. When the transistor 16 remains cut off even when the brake pedal 5 is pushed, the piston 7-34 remains in the initial position (right position), but the valve 7-17 is closed whereas the air valve 7-13 is opened so that the pressure in the chamber B 7-15 reaches the atmospheric pressure. As a result, the diaphragms 7-19 and the hydraulic piston 7-20 are caused to move to the right. When the slip ratio $\beta$ becomes in excess of $\beta_c$ and the transistor 16 is conducted, the core 7-33 and the piston 7-34 are moved to the left as shown in FIG. 3. Now the pressure in the chamber A 7-14 becomes the atmospheric pressure whereas the pressure in the chamber B 7-15 becomes negative so that the diaphragms 7-19 and the hydraulic piston 7-20 are caused to move to the left. As a consequence the hydraulic pressure in the wheel cylinders is decreased.

In addition to the variation of the control device 7 described hereinabove with reference to FIG. 3, various modifications and variations may be effected. For example, there may be employed a system in which in response to the ON-OFF state of the transistor 16, a valve piston 7-10 may be moved upwardly or downwardly or the hydraulic pressure in the left chamber 7-8a of the hydraulic cylinder is decreased or returned to its uncontrolled pressure by the control device 7. In short, there may be employed any system which is capable of reciprocating the valve piston 7-20 so as to decrease the hydraulic pressure in the wheel cylinders and to return their pressures to their initial magnitudes. There may be also employed a system in which the volume of the brake pipe 3-4 may be varied under the control of a solenoid or the like so as to vary the hydraulic pressure in the wheel cylinders.

So far the pneumatic-hydraulic control 7 has been described as being communicated with the surrounding atmosphere and the engine intake manifold so as to utilize the atmospheric pressure and the negative pressure, but it may be understood to those skilled in the art that an appropriate air pump may be employed in order to produce the positive pressure or air under pressure so that the former and the atmospheric pressure may be utilized. As to the wheel speed detector 12, in addition to the electric-generator tachometer described above, any other tachometer may be employed, and the measuring point is not limited to the propeller shaft and the wheel speed may be directly measured at the wheel.

In the above embodiment and its variation, 19-1 and 19-2 of the feedback circuit have been described as being connected or disconnected in response to the release or push-down of the brake pedal, but it is understood that there may be employed a system in which 19-1 and 19-2 of the feedback circuit are disconnected when the acceleration in the vehicle's forward in moving direction or the hydraulic pressure in the master cylinder is in excess of a predetermined value. In short, there may be employed any system which can disconnect 19-1 and 19-2 of the feedback circuit before the wheels start to slip. Examples are shown in FIGS. 7 and 8. In the variation shown in FIG. 7, 19-1 and 19-2 of the feedback circuit are connected or disconnected in response to the acceleration. When the output of the amplifier 10 is in excess of a predetermined magnitude, a switching transistor 31 is conducted so that the relay 17 is de-energized. As a result, 19-1 and 19-2 of the feedback circuit are disconnected. In the variation shown in FIG. 8, 19-1 and 19-2 of the feedback circuit are connected or disconnected in response to the hydraulic pressure in the master cylinder which is transmitted through a pipe 32 to the left chamber 35. When the brake pedal is not pushed, the piston 33 remains in the left position under the force of the spring 34 so that the contacts 17-4 and 17-5 are connected by piston 33. On the other hand, when the brake pedal is pushed so that the hydraulic pressure increases, the piston 33 moves to the right so that the contacts 17-4 and 17-5 are disconnected. Therefore 19-1 and 19-2 of the feedback circuit are disconnected.

Figure 9:
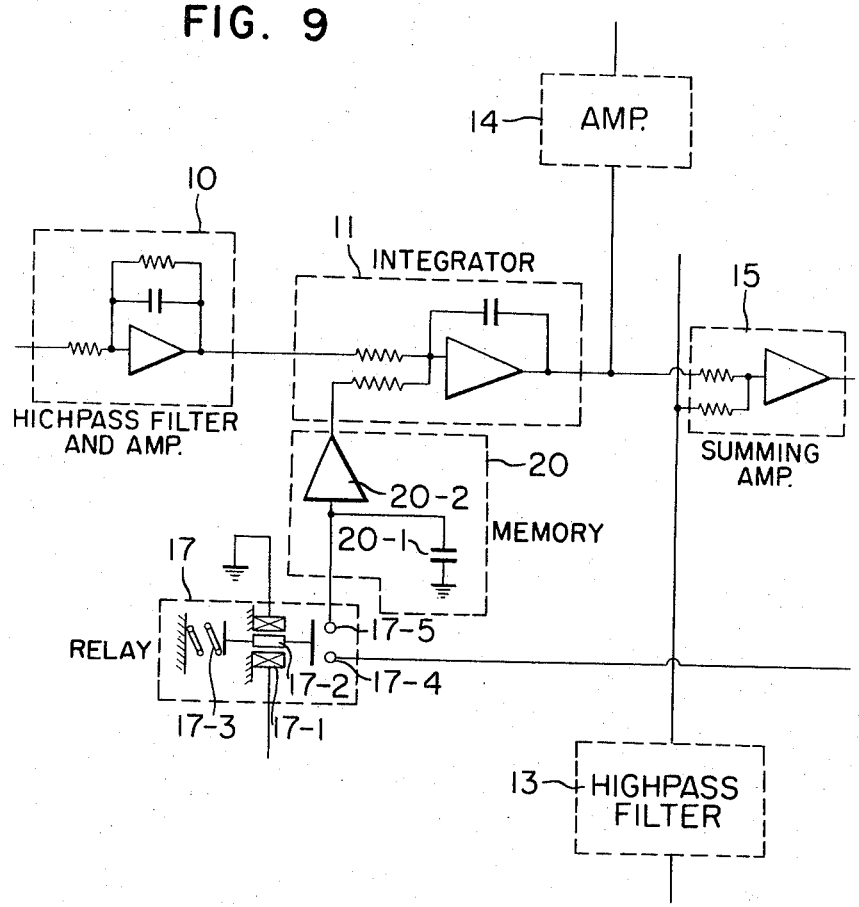
FIG. 9 is a circuit diagram of a variation of a memory in the feedback circuits.

In the embodiment shown in FIG. 2, the memory 20 has been described as comprising a capacitor whose one terminal is grounded, but it is understood that the present invention is not limited to this arrangement. For example, in FIG. 9 is shown a variation comprising a capacitor 20-1 and an amplifier 20-2 with a high input resistance interconnected between the capacitor 20-1 and the integrator 11. The output terminal of the amplifier 20-2 is connected to the inverting input terminal of the integrator 11 connected to the amplifier 10. Therefore, the function of the first summing amplifier 15 in the feedback circuit is much improved and the response of the feedback circuit may be much enhanced.

In the embodiment shown in FIG. 2, the output terminal of the memory 20 has been described as being connected to the inverting input terminal of the integrator 11 connected to the amplifier 10, but it is to be understood that the present invention is not limited thereto. For example, when the output terminal of the memory 20 may be connected to noninverting input terminal and a negative feedback circuit may be formed, the content in the memory 20 may be maintained for a considerably long time and an additional amplifier may be eliminated. Therefore the design of the electronic circuit may be much simplified.

The experimental data obtained from the tests of the embodiment shown in FIG. 2 are illustrated in FIG. 4. FIG. 4-a is a graph illustrating the relation between the true vehicle speed $v_\alpha$ and time; FIG. 4-b is a graph illustrating the relation between the vehicle speed $v_\gamma$ obtained by integrating the acceleration of the moving vehicle and time; FIG. 4-c is a graph illustrating the relation between the wheel speed $V_w$ and time; and FIG. 4-d is a graph illustrating the ON-OFF of the transistor 16. From these graphs it is seen that the function of the device of the present invention is operated in a desirable condition.

Figure 5:
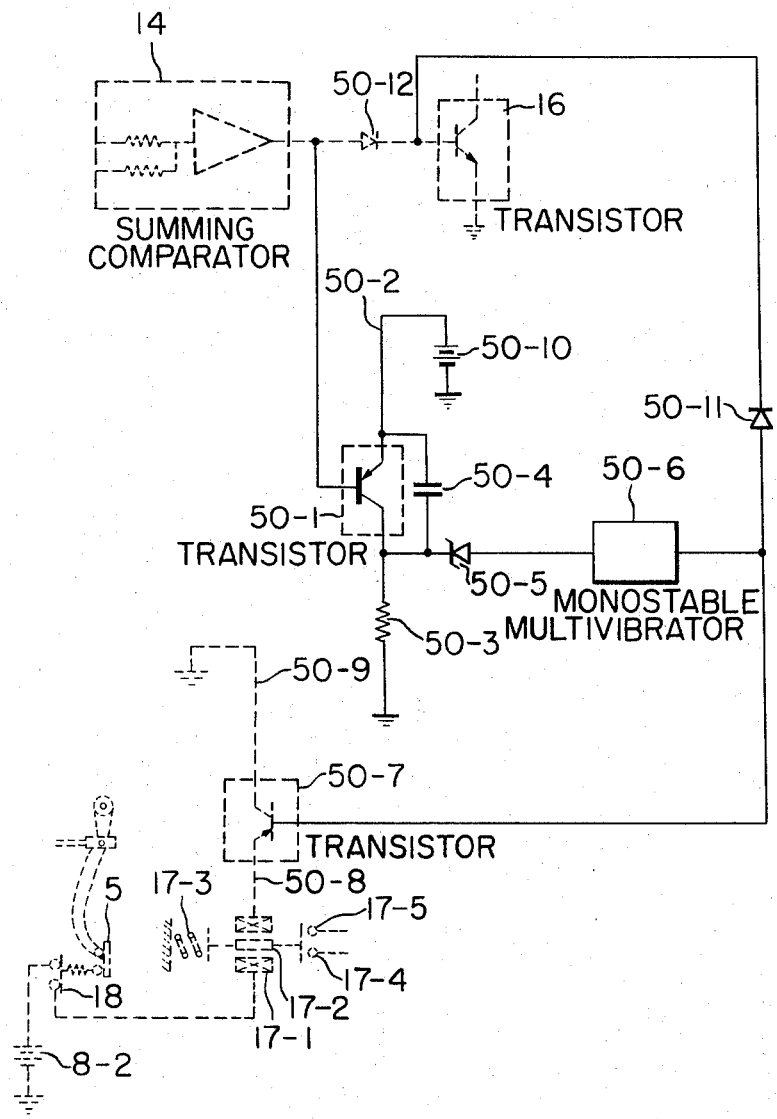
FIG. 5 is a diagrammatic view of a device for preventing the braking force from being kept reduced.

From the foregoing description and the experimental data shown in FIG. 4, it is seen that the system and device in accordance with the present invention function very satisfactorily under almost every condition, but the reliability under most unfavorable conditions which occur very rarely must be considered. For example, when the driver is pushing the brake pedal 5, the speed $v \gamma$ obtained from the integrator becomes higher than the true speed $v_\alpha$ when (the vehicle starts to travel on the flat road from the downhill road or,) the accelerometer 9 or the amplifier 10 is disturbed by the noise. Even under such a condition, there arises no problem when the deviation of $v_\gamma$ rom the true speed $v_\alpha$ is small. However when the deviation is greater, the braking force is reduced more often than required. To overcome this problem, the present invention provides a compensator shown in FIG. 5. Now referring to FIG. 5, the output of the summing amplifier 14 is applied to a transistor 50-1 which is so biased that when the base potential (which is the output of the summing amplifier 14) is negative, the transistor 50-1 is conducting, that is the emitter circuit 50-2 is electrically connected to the collector circuit 50-3, and when the base potential is positive the transistor is cut off, that is the emitter circuit 50-2 is electrically disconnected from the collector circuit 50-3. Therefore, it is readily seen that when the output of the summing amplifier 14 is positive so that the transistor 16 is conducting to reduce the braking force, the transistor 50-1 is cut off. As a result, a capacitor 50-4 connected in parallel to the transistor 50-1 starts to charge. When the collector potential reaches a predetermined value, a Zener diode 50-5 is turned off so that a monostable multivibrator 50-6 produces one pulse. This pulse causes a transistor 50-7 to turn off. That is, the emitter circuit 50-8 is disconnected from the collector circuit 50-9 so that the core 17-2 is moved toward the right under the force of the spring 17-3, thereby connecting the contacts 17-4 and 17-5. Therefore 19-1 and 19-2 of the feedback circuit described with reference to FIG. 2 are connected so that the feedback circuit is operated to compute the vehicle speed $v \gamma$ equal to the wheel speed $v \omega$. As soon as the pulse disappears, 19-1 and 19-2 of the feedback circuit are disconnected, and a new compensation signal is stored in the memory 20 so that the correct computing of the integrator 11 may be started again. In FIG. 5, reference numeral 50-10 designates a d-c power source; and 50-11 and 50-12, diodes. The diode 50-11 permits the pulse from the monostable multivibrator 50-6 to be applied to the base of the transistor 16 so that the solenoids 7-1 and 7-4 (See FIG. 2) and the solenoid 7-35 (See FIG. 3) may be energized. On the other hand, the diode 50-12 is inserted in order to prevent the application of the signal from the diode 50-11 to the base of the transistor 50-1. The reason why the diode 50-11 must be inserted is as follows. When 19-1 and 19-2 of the feedback circuit are connected in response to the pulse from the monostable multivibrator 50-6, the vehicle speed $v \gamma$ approaches the wheel speed $v \omega$ so that the output of the summing amplifier 14 becomes negative. Therefore if the diode 50-11 is not inserted, the transistor 16 would be immediately cut off so that the solenoids 7-1 and 7-4 or 7-35 would be de-energized. As a consequence, the hydraulic pressure in the wheel cylinders 3-1 would be increased to apply the brake. It is not preferable that the vehicle speed $v \gamma$ is set again in response to the wheel speed $v \omega$ under the above condition because the wheels might be skidding. Therefore it follows that the correct vehicle speed $v \gamma$ may be set when the brake is released as long as 19-1 and 19-2 of the feedback circuit are connected so as to make the vehicle speed $v \gamma$ equal to the wheel speed $v \omega$. In order to determine a time interval $T_c$ from the time when the capacitor 50-4 starts to charge to the time when the Zener diode 50-5 is cut off and the pulse width or duration $T_s$ of the pulse from the monostable multivibrator 50-6, the following conditions must be taken into account. $T_s$ must be sufficient enough to connect 19-1 and 19-2 of the feedback circuits as to compute the vehicle speed $v \gamma$ equal to the wheel speed $v \omega$. The sum $T_c + T_s$ must be sufficient enough to eliminate the skidding of the wheels after the braking force is reduced. The experiments showed that $T_s = 0.1$ to 0.25 seconds whereas $T_c + T_s = 0.3$ to 0.5 seconds.

The data obtained from the tests of the automatic braking control device with the compensator of the type described above with reference to FIG. 5 are shown in FIG. 6. The accelerometer was under the influence of a disturbance at the point Y in FIG. 6-b so that the deviation of the vehicle speed $v \gamma$ from the true speed $v_\alpha$ was increased, but at the point Z, the vehicle speed $v \gamma$ was corrected so that the correct vehicle speed was obtained. Thus, the compensator described above with reference to FIG. 5 proves very effective in preventing the braking force from being kept reduced.

From the foregoing description, it is seen that according to the present invention, the reduction and recovery of the braking force are controlled in response to the slip ratio $\beta$ obtained from the vehicle speed obtained by the integration of the acceleration of the moving vehicle and the wheel speed so that its function is highly reliable, and is very efficient and its mechanism is very simple because the ON-OFF control system is employed.

Furthermore, because of the provision of the memory, the drifts and noise in upon the amplifier and the accelerometer and effect of the gravitational acceleration in the accelerometer may be canceled. Furthermore, when the braking force is reduced beyond a predetermined time interval because of the noise or the change in the grade of the road, the noise and the change in the grade of the road may be canceled so that the braking force is recovered, whereby the safety in driving can be ensured.

In the embodiment and variations described above, the braking control has been described as being applied only to the rear wheels, but it may be applied to both the front and rear wheels of not only an automotive vehicle but also an airplane or the like.

What is claimed is:

1. An automatic brake controlling method for a brake to apply the braking forces to wheels of a moving vehicle, comprising detecting an acceleration of the moving vehicle, simultaneously detecting a wheel speed of said moving vehicle, computing a vehicle speed by integrating said acceleration with an integrator, computing an electrical signal indicating the difference between said vehicle speed and said wheel speed by comparing said computed vehicle speed and said detected wheel speed, feeding back the electrical signal indicating the difference between said vehicle speed and said wheel speed to said integrator and a memory circuit through a first switching means so as to compute said vehicle speed equal to said wheel speed, whenever the brake is not applied, opening said feedback circuit immediately after the application of the brake, cancelling drifts, noises, the effects of gravitational acceleration when said moving vehicle is travelling on an inclined road, in the instruments adapted to obtain the vehicle speed such as means for detecting the acceleration by the electrical signal indicating the difference between said vehicle speed and said wheel speed memorized by the memory circuit connected to the input of said integrator, computing whether a slip ratio of said wheel speed to said vehicle speed is larger than a predetermined value or not, and controlling the braking force in such manner that the braking force is reduced whenever said slip ratio is larger than said predetermined value and the braking force is recovered whenever said slip ratio is smaller than said predetermined value, when the brake is applied.

2. An automatic controlling method for a brake to apply the braking force to wheels of a moving vehicle, comprising detecting an acceleration of the moving vehicle, simultaneously detecting a wheel speed of said moving vehicle, computing a vehicle speed by integrating said acceleration with an integrator, computing an electrical signal indicating the difference between said vehicle speed and said wheel speed by comparing said computed vehicle speed and said detected wheel speed, feeding back the electrical signal indicating the difference between said vehicle speed and said wheel speed to said integrator and a memory circuit through a first switching means so as to compute said vehicle speed equal to said wheel speed, whenever the brake is not applied, opening said feedback circuit immediately after the application of the brake, cancelling drift, noises, the effects of gravitational acceleration when said moving vehicle is travelling on an inclined road, in the instruments adapted to obtain the vehicle speed such as means for detecting the acceleration by the electrical signal indicating the difference between said vehicle speed and said wheel speed memorized by the memory circuit connected to the input of said integrator, computing whether a slip ratio of said wheel speed to said vehicle speed is larger than a predetermined value or not, controlling the braking force in such manner that the braking force is reduced whenever the slip ratio is larger than said predetermined value and the braking force is recovered whenever said slip ratio is smaller than said predetermined value, when the brake is applied, closing said feedback circuit for a first predetermined time period after reducing the braking force for a second predetermined time period so as to feedback the electrical signal indicating the difference between said vehicle speed and said wheel speed to said integrator and said memory circuit, to correct said vehicle speed to be equal to said wheel speed, and to cancel said drift, noises, the effects of gravitational acceleration when said moving vehicle is travelling on an inclined road, in the instrument for obtaining the vehicle speed, thereby to attain the more precise brake controlling.

3. An automatic brake controlling device comprising means for detecting the acceleration of a moving vehicle and generating the electrical signal representing said detected acceleration, means for detecting the wheel speed and generating the electrical signal representing said detected wheel speed, a feedback control circuit comprising an integrator, a first summing amplifier, and a first switcing means, said integrator, first summing amplifier and first switching means connected in series forming a feedback loop in such manner that the output of said first summing amplifier may be fed back to the input of said integrator through said first switching means, the input of said integrator being connected to the output of said means for detecting the acceleration, and the input of said first summing amplifier being connected to the output of said means for detecting the wheel speed, a memory circuit comprising a capacitor whose one terminal is grounded, said memory circuit being connected to said feedback circuit between said first switching means and said integrator, a switching circuit comprising a second summing amplifier and a second switching means connected in series, the input of said second summing amplifier being connected to said feedback circuit between said integrator and said first summing amplifier and to the output of said means for detecting the wheel speed, means for controlling the braking force produced by a brake, one end thereof being connected to said brake for applying the braking forces to wheels, and the other end thereof being connected to the output of said second switching means in said switching circuit, and means for turning on or off said first switching means of said feedback circuit in response to the condition of application of braking by the brake.

4. An automatic brake controlling device according to claim 3, wherein is further provided, means for closing said feedback circuit for a first predetermined time period after reducing the braking force for a second predetermined time period so as to feedback the electrical signal indicating the difference between said vehicle speed signal and said wheel speed signal to said integrator and said memory circuit, to cancel drifts, noises and, the effects of the gravitational acceleration occuring while said moving vehicle is travelling on an inclined road, in the instruments adapted to obtain the vehicle speed such as means for detecting the acceleration by the electrical signal indicating the difference between said vehicle speed signal and said wheel speed signal memorized by the memory circuit, thereby to attain the more precise brake controlling.

5. An automatic brake controlling device according to claim 4, wherein said means for closing said feedback circuit for a first predetermined time period when keeping on reducing the braking force beyond a second predetermined time period, comprises a compensation circuit comprising a transistor having a base connected to the output of said second summing amplifier of said switching circuit, an emitter connected to a D - C power source, and a collector connected, to a resistor, a capacitor having ends thereof connected respectively to, said emitter and collector of said transistor, a Zener diode connected to said collector of said transistor, and a monostable multivibrator having an input thereof connected to said Zener diode and an output, thereof connected to a transistor as a switching means of said means for turning on or off said first switching means and to the output of said second summing amplifier, thereby to attain the more precise brake controlling.

6. An automatic brake controlling device according to claim 3, wherein said means for detecting the acceleration of said moving vehicle and generating the electrical signal representing said detected acceleration is an accelerometer.

7. An automatic brake controlling device according to claim 3, wherein said means for detecting the wheel speed and generating the electrical signal representing said detected wheel speed is a tachometer.

8. An automatic brake controlling device according to claim 3, wherein said means for turning on or off said first switching means comprises a D - C power source, a limit switch controlled to turn on or off by the brake pedal, and a relay comprising coils, a core connected to a contact member of said first switching means in said feedback circuit, and a spring to press said core, said D - C source, limit switch and relay are connected electrically in series, thereby to control said first switching means to turn on or off and said feedback circuit to close or open in response to pushing of the brake pedal.

9. An automatic brake controlling device according to claim 3, wherein said means for turning on or off said first switching means comprises a D - C power source, a switching transistor connected to said means for detecting the acceleration of said moving vehicle, and a relay connected to a contact member of said first switching means, thereby to control said first switching means to turn on or off and said feedback circuit to close or open in response to acceleration of said means for detecting the acceleration of said moving vehicle.

10. An automatic brake controlling device according to claim 3, wherein said means for turning on or off said first switching means comprises a cylinder connected to a master cylinder of the brake, a piston connected to a contact member of said first switching means, and a coil to push the piston, thereby to control said first switching means to turn on or off and said feedback circuit to close or open in response to the hydraulic pressure of said master cylinder.

11. An automatic brake controlling device according to claim 3, wherein an amplifier with a high input resistance is further provided between said capacitor and a connecting point to said feedback circuit in said memory circuit.

12. An automatic brake controlling device according to claim 3, wherein said means for controlling the braking force produced by a brake, comprises a first passage connected respectively to two chambers of a brake booster, a first relay comprising a solenoid connected to said second switching means and a D - C power source, a core connected to a valve interposed within said first passage, and a spring to push said core, a second passage connected to one chamber of said brake booster, a second relay comprising a solenoid connected to said second switching means and said D - C power source, a core connected to a valve interposed within said second passage, and a spring to push said core, thereby to control the valves of said first and second passage to open or close, and to control the braking force.

13. An automatic brake controlling device according to claim 12, wherein said means for detecting the acceleration of said moving vehicle and generating the electric signal representing said detected acceleration is an accelerometer, said means for detecting the wheel speed and generating the electrical signal representing said detected wheel speed is a tachometer,
a brake pedal for controlling said brake, and
said means for turning said first switching means on or off comprises
a D-C power source
a limited switch positioned to be turned on or off by the brake pedal, and
a relay comprising coils, a core connected to a contact member of said first switching means in said feedback circuit, and a spring positioned to bias said core; said D-C power source, limit switch and coils of the last mentioned relay being connected electrically in series, thereby to control said first switching means to turn on or off and said feedback circuit to close or open in response to pushing of the brake pedal.

14. An automatic brake controlling device according to claim 3, wherein
said means for additionally controlling the braking force produced comprises
a four-way valve having two passages connected to each chamber of a brake booster a passage connected to engine intake manifold, and a piston, and
a relay comprising a solenoid connected to said second switching means and a D - C power source, a core connected to said piston of said four-way valve, and a spring to push said core,
thereby to connect selectively said passages connected to each chamber of a brake booster to said passage connected to engine intake manifold by controlling the position of said piston in response to pushing of the brake pedal, and to control the braking force.

15. An automatic brake controlling device comprising
an accelerometer,
a wheel speed detector,
means for integrating the output of the accelerometer,
slip ratio means for sensing the slip ratio between the vehicle speed obtained by integrating the accelerometer output and the wheel speed obtained from the wheel speed detector,
control means connected to said slip ratio means for controlling the wheel speed to maintain the sensed slip ratio within a predetermined range, and storage means connected to said slip ratio means for sensing a constant error signal in said slip ratio due to drift, noise and gravitational acceleration, said storage means being connected to said control means to adjust the wheel speed in accordance with said constant error signal.

16. An automatic brake controlling device according to claim 15, wherein said slip ratio means comprises comparator means for comparing representations of the vehicle and wheel speeds.

17. An automatic brake controlling device according to claim 16, wherein the output of said storage means is connected to said comparator means.

18. An automatic brake controlling device according to claim 15, wherein said slip ratio, control and storage means form an electronic feedback circuit, said electronic feedback circuit being actuated while said vehicle is moving with the brake of the vehicle being applied to generate said constant error signal, said storage means applying said constant error signal to said comparator after said brake is applied, said feedback circuit becoming an open loop when said brake is applied.

* * * * *